(12) United States Patent
Fujii et al.

(10) Patent No.: US 8,256,302 B2
(45) Date of Patent: Sep. 4, 2012

(54) CAPACITIVE ELECTRO-MECHANICAL TRANSDUCER

(75) Inventors: Kazunari Fujii, Kawasaki (JP); Yoshitaka Zaitsu, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 12/786,212

(22) Filed: May 24, 2010

(65) Prior Publication Data
US 2010/0300208 A1    Dec. 2, 2010

(30) Foreign Application Priority Data
May 27, 2009    (JP) .................................. 2009-127092

(51) Int. Cl.
*G01L 9/12*    (2006.01)
(52) U.S. Cl. .......................................... 73/724; 73/718
(58) Field of Classification Search ............. 73/700–756
See application file for complete search history.

(56) References Cited

U.S. PATENT DOCUMENTS

| | | | |
|---|---|---|---|
| 6,688,179 B2 * | 2/2004 | Potter et al. ..................... 73/700 |
| 7,140,085 B2 * | 11/2006 | Bjoerkman et al. .......... 29/25.42 |
| 2007/0261496 A1 * | 11/2007 | Jonsson et al. .................. 73/723 |
| 2008/0184787 A1 * | 8/2008 | Coates ........................ 73/152.12 |
| 2010/0083768 A1 * | 4/2010 | Hedtke et al. ................... 73/724 |
| 2010/0300208 A1 * | 12/2010 | Fujii et al. ....................... 73/724 |
| 2011/0271764 A1 * | 11/2011 | Lee ................................. 73/718 |

FOREIGN PATENT DOCUMENTS

| JP | 59-93413 A | 5/1984 |
|---|---|---|
| JP | 2004-125514 A | 4/2004 |
| JP | 2008-258815 A | 10/2008 |

OTHER PUBLICATIONS

Oliver Ahrens et.al.,IEEE Transactions on Ultrasonics,Ferroelectrics,and Frequency Control,vol. 49,No. 9,pp. 1321-1329,2002.

Veijola,Helsinki Univ.Tech,Curcuit Theory Laboratory Report Series,CT-39,1999.

* cited by examiner

*Primary Examiner* — Andre Allen
(74) *Attorney, Agent, or Firm* — Canon U.S.A., Inc. IP Division

(57) ABSTRACT

A capacitive electro-mechanical transducer includes a cell, the cell including a first electrode and a second electrode that is disposed opposite the first electrode with a gap therebetween; and a pressure-adjusting unit for adjusting pressure in the gap.

5 Claims, 3 Drawing Sheets

CAPACITIVE ELECTRO-MECHANICAL TRANSDUCER

BACKGROUND OF THE INVENTION

1. Field of the Invention

The present invention relates to a capacitive electro-mechanical transducer such as a capacitive micromachined ultrasonic transducer.

2. Description of the Related Art

Recently, much research has been performed on capacitive electro-mechanical transducers that are fabricated by using micromachining processes. A capacitive electro-mechanical transducer usually has cells. A cell includes a lower electrode, a vibrating diaphragm that is supported at a predetermined distance from the lower electrode, and an upper electrode that is disposed on the front surface or back surface of the vibrating diaphragm. Such a capacitive electro-mechanical transducer is used as a Capacitive Micromachined Ultrasonic Transducer (CMUT), for example.

The above-described transducer coverts electrical signals to ultrasonic waves, converts ultrasonic waves to electrical signals, or performs both conversions, by using the lightweight vibrating diaphragm. A transducer of this kind that exhibits excellent broadband characteristics both in liquids and in air can be readily obtained. Since more precise medical diagnosis is possible by using this transducer, attention is being paid to this technique. The principle of operation of this transducer will be described. To transmit ultrasonic waves, a DC voltage on which a very small AC voltage is superposed is applied between the lower electrode and the upper electrode. Thus, the vibrating diaphragm is vibrated and ultrasonic waves are generated. When ultrasonic waves are received, the vibrating diaphragm is deformed by the ultrasonic waves, and changes in the capacitance between the lower electrode and the upper electrode due to the deformation are detected and a signal is thereby obtained. A transducer usually has a plurality of elements, each of which has a plurality of electrically connected cells. In such a configuration, the plurality of elements sometimes vary in sensitivity, and for this reason a method of sensitivity correction has been proposed (Japanese Patent Laid-Open No. 2004-125514). In this method, the output signals produced by ultrasonic-waves-detecting elements are electrically adjusted by a control unit such that the variations in the output signals (variations in the sensitivity) become small.

The sensitivity of the above-described cell or element is inversely proportional to the square of the distance (gap) between the electrodes, for example. Therefore, variations in the distances between the electrodes result in variations in the sensitivity of the transducer. The gap of a capacitive electro-mechanical transducer is generally formed by providing a sacrificial layer whose thickness is equal to the desired distance between the electrodes, forming a vibrating diaphragm above the sacrificial layer, and removing the sacrificial layer.

When medical diagnosis is performed by using a transducer that includes a plurality of elements each of which includes a plurality of electrically connected cells, variations in the sensitivity of the plurality of elements decrease the precision of the diagnosis. Therefore, it is necessary to correct the sensitivity of the individual elements. However, if the sensitivity correction is performed by adjusting the gain in a subsequent circuit as described in Japanese Patent Laid-Open No. 2004-125514, it is necessary to make the dynamic range of the circuit wide. Furthermore, if the variations are too large, correction is impossible.

SUMMARY OF THE INVENTION

A capacitive electro-mechanical transducer according to an aspect of the present invention includes a cell and a pressure-adjusting unit. The cell has a first electrode and a second electrode that is disposed opposite the first electrode with a gap therebetween. The pressure-adjusting unit adjusts the pressure in the gap.

Further features of the present invention will become apparent from the following description of exemplary embodiments with reference to the attached drawings.

DESCRIPTION OF THE EMBODIMENTS

Figure 1A:
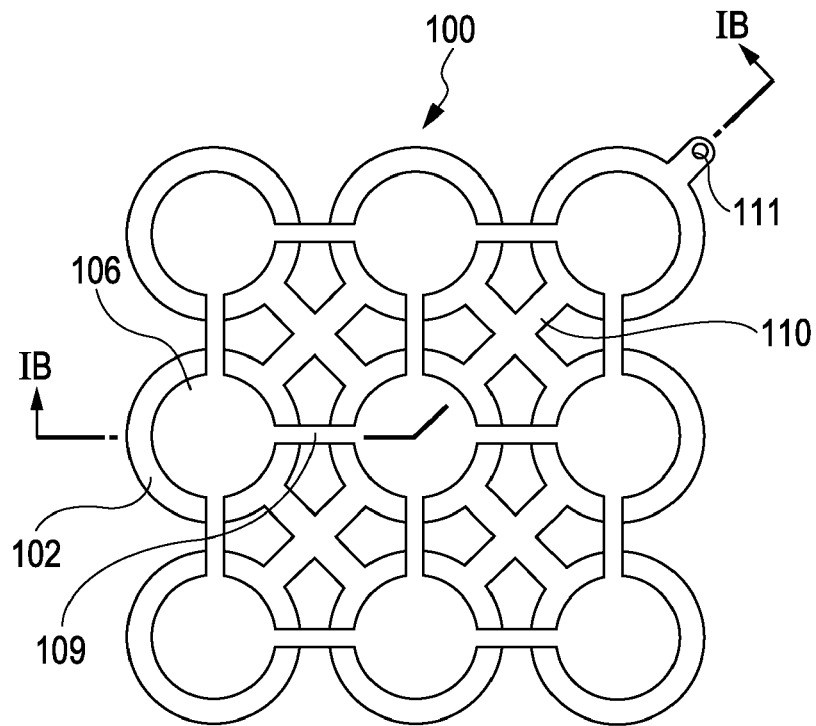
FIGS. 1A and 1B illustrate the basic structure of a capacitive electro-mechanical transducer of a first embodiment of the present invention.

Embodiments of the present invention will be described below. It is important in the capacitive electro-mechanical transducer according to the embodiments of the present invention that one or more cells or elements be provided with a pressure-adjusting unit that adjusts the pressure in the gap.

The configuration of a basic embodiment of the capacitive electro-mechanical transducer of the present invention will be described below. The capacitive electro-mechanical transducer includes a cell. The cell has a first electrode (referred to as a lower electrode in the later-described embodiment), and a second electrode (referred to as an upper electrode in the later-described embodiment) that is disposed opposite the first electrode with a gap therebetween. The capacitive electro-mechanical transducer can at least receive elastic waves from outside. Moreover, the capacitive electro-mechanical transducer has a pressure-adjusting unit that adjusts the pressure in the gap. The capacitive electro-mechanical transducer may, of course, be configured so as to be able to transmit elastic waves such as ultrasonic waves to the outside. The transmission and reception are performed as described in BACKGROUND OF THE INVENTION.

A more specific embodiment that is based on the above-described basic embodiment is possible. That is, the capacitive electro-mechanical transducer may have a plurality of elements each of which may include a plurality of cells. At least one of the elements may be provided with a pressure-adjusting unit (see a later-described second embodiment). Each of the elements may be provided with a pressure-adjusting unit, or alternatively, a plurality of elements may share a pressure-adjusting unit. In the latter case, the gaps of the plurality of elements can be adjusted to have equal pressure.

The pressure-adjusting unit can adjust the pressure in the gap so as to adjust the sensitivity of a cell or an element (as in the later-described first embodiment), or to reduce variations in the sensitivity of a plurality of elements (as in the later-described second embodiment). The cell may include a lower electrode that is a first electrode, an upper electrode that is a second electrode, and a vibrating diaphragm on which the second electrode is disposed. The upper electrode used in the embodiments of the present invention may use at least one of metals selected from Al, Cr, Ti, Au, Pt, Cu, Ag, W, Mo, Ta, and Ni, and alloys selected from AlSi, AlCu, AlTi, MoW, and AlCr. The upper electrode may be disposed on the upper side, on the lower side, or in the interior of the vibrating diaphragm. Furthermore, the upper electrode may be disposed at more than one of these locations. Alternatively, when the vibrating diaphragm is formed of a conductive material or a semiconductor material, the vibrating diaphragm itself may serve as the upper electrode. The lower electrode used in the embodiments of the present invention may use a metal such as those used for the upper electrode. When the substrate is formed of a semiconductor material such as silicon, the substrate itself may serve as the lower electrode.

First Embodiment

Figure 1B:
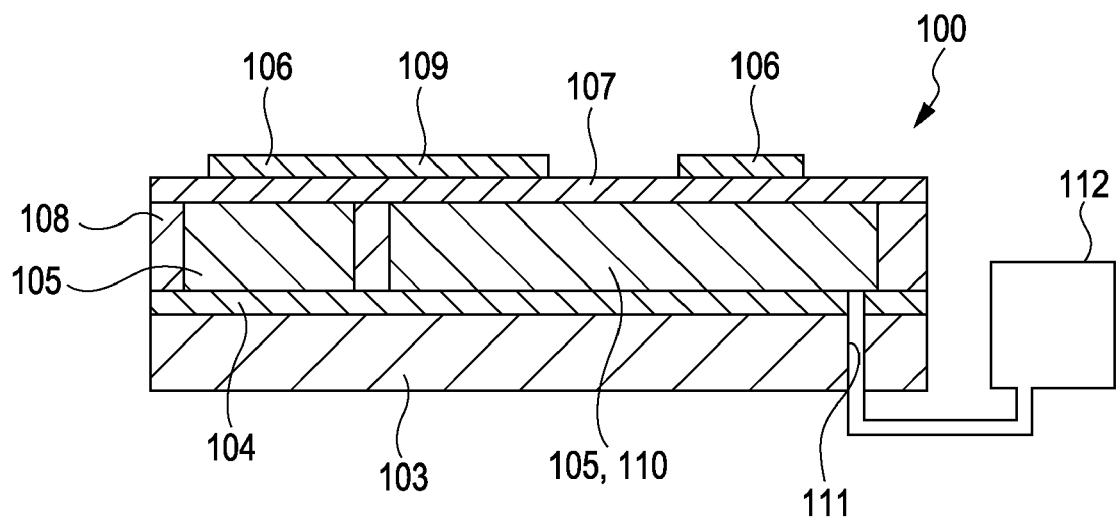

A capacitive electro-mechanical transducer of a first embodiment of the present invention will be described below with reference to the drawings. As shown in FIGS. 1A and 1B, a capacitive electro-mechanical transducer 100 has a plurality of cells 102. Nine cells 102 are arranged in an element, which is a transducer, in FIG. 1A. However, the number of cells is not limited to this number. At least one cell is provided in an element. Each of the cells 102 includes a lower electrode 104 that is disposed on a substrate 103, an upper electrode 106 that is disposed opposite the lower electrode with a gap 105 of predetermined width therebetween, a vibrating diaphragm 107 that supports the upper electrode, and a supporting portion 108 that supports the vibrating diaphragm. The lower electrode 104 is a common electrode of the transducer 100. The upper electrodes 106 of the cells in the element are connected by an electrode 109. The gaps 105 of the cells communicate with one another through a gap-connecting passage 110, and the pressure in the gaps of the cells in the element of the transducer 100 is uniform. The gaps 105 of the cells have a circular shape in the example shown in FIG. 1A, but may have other shapes. Also, the manner in which the electrodes are connected is not limited to the above-described manner. The shape of the gaps and the manner of connection may be appropriately chosen in accordance with specification.

The gaps 105 of the cells communicate with a pressure-adjusting unit 112 through a through-hole 111 of the substrate 103. The pressure-adjusting unit 112 may use a common miniature pump such as a diaphragm pump, an electromagnetic pump, or a motor pump. A diaphragm pump sucks and discharges fluid by moving a diaphragm back and forth. An electromagnetic pump is one type of diaphragm pump in which the diaphragm is moved back and forth by using an electromagnet as in a loudspeaker. A motor pump is one type of diaphragm pump in which the diaphragm is moved back and forth by using a motor that is coupled to the diaphragm through a crank mechanism. The pressure-adjusting unit 112 adjusts the pressure in the gaps of the cells by using such a pump.

Figure 1C:
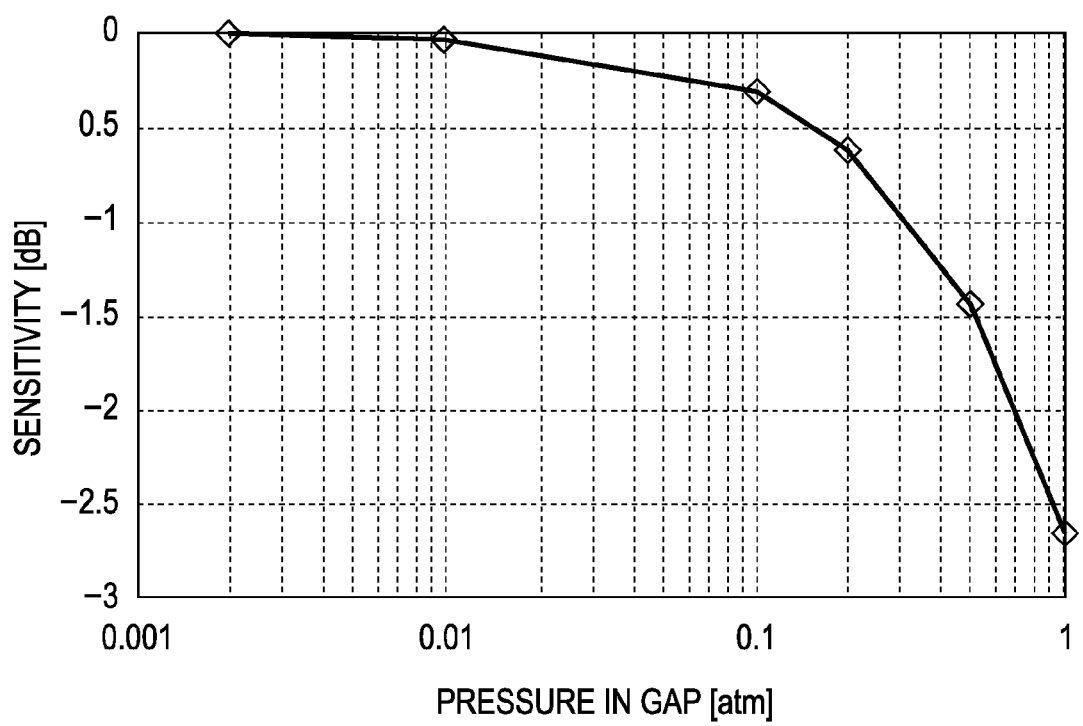
FIG. 1C illustrates the relation between the pressure in the gap of a cell and the sensitivity of the capacitive electro-mechanical transducer.

The relation between the pressure in the gaps of the cells and the sensitivity of the capacitive electro-mechanical transducer was simulated, and the result is shown in FIG. 1C. In FIG. 1C, the horizontal axis represents the pressure in the gaps, and the vertical axis represents the sensitivity. The sensitivity is expressed relatively, and the sensitivity at a pressure of 0.002 atm serves as the reference level (0 dB). In the simulation, first, the initial displacement of the vibrating diaphragms due to the pressure difference between the pressure in the gaps of the cells and the exterior atmospheric pressure was calculated by using the finite element method. Next, the magnitude of the electrical signal that is generated per unit sound pressure of ultrasonic waves that are incident on the vibrating diaphragms was calculated by using an equivalent circuit model. In the equivalent circuit model, mechanical characteristics (elasticity and viscosity, and mass) of the gas in the gaps of the cells and the vibrating diaphragms are compared to elements (capacitors and resistors, and coils) of an electric circuit. In this way, the mechanical and electrical characteristics of the cells are expressed by a single circuit equation (see Oliver Ahrens et al., IEEE TRANSACTIONS ON ULTRASONICS, FERROELECTRICS, AND FREQUENCY CONTROL, VOL. 49, NO. 9, PP. 1321-1329, 2002; and Veijola, Helsinki Univ. Tech, Circuit Theory Laboratory Report Series, CT-39, 1999). The calculation that used the finite element method was performed by using a commercially available software (ANSYS 11.0, ANSYS Inc.). As shown in FIG. 1C, when the pressure in the gaps increases, the sensitivity decreases. When the pressure in the gaps decreases, the sensitivity increases. The pressure in the gaps 105 is adjusted by the pressure-adjusting unit 112 such that the transducer 100 has a desired degree of sensitivity.

As shown in FIG. 1C, when the pressure in the gaps is less than or equal to 0.1 atm (10.1325 kPa), decrease in the sensitivity as compared with the sensitivity at a pressure of 0.002 atm (0.20265 kPa) is less than or equal to 5%. Therefore, to limit the decrease in the sensitivity to less than or equal to 5%, a pressure-adjusting unit that adjusts the pressure in the gaps to be less than or equal to 0.1 atm can be used.

Changes in the atmospheric pressure on the upper side of the vibrating diaphragm 107 also change the sensitivity. Even in such cases, a desired degree of sensitivity can be maintained regardless of the atmospheric pressure on the upper side of the vibrating diaphragm by adjusting the pressure in the gaps by using the pressure-adjusting unit 112. By using the transducer 100 of the present embodiment, a capacitive electro-mechanical transducer can be provided which can be adjusted to a desired degree of sensitivity in order to reduce pressure variations between the elements, to correct a pressure that has changed owing to aging of the transducer, and so on.

Second Embodiment

Figure 2:
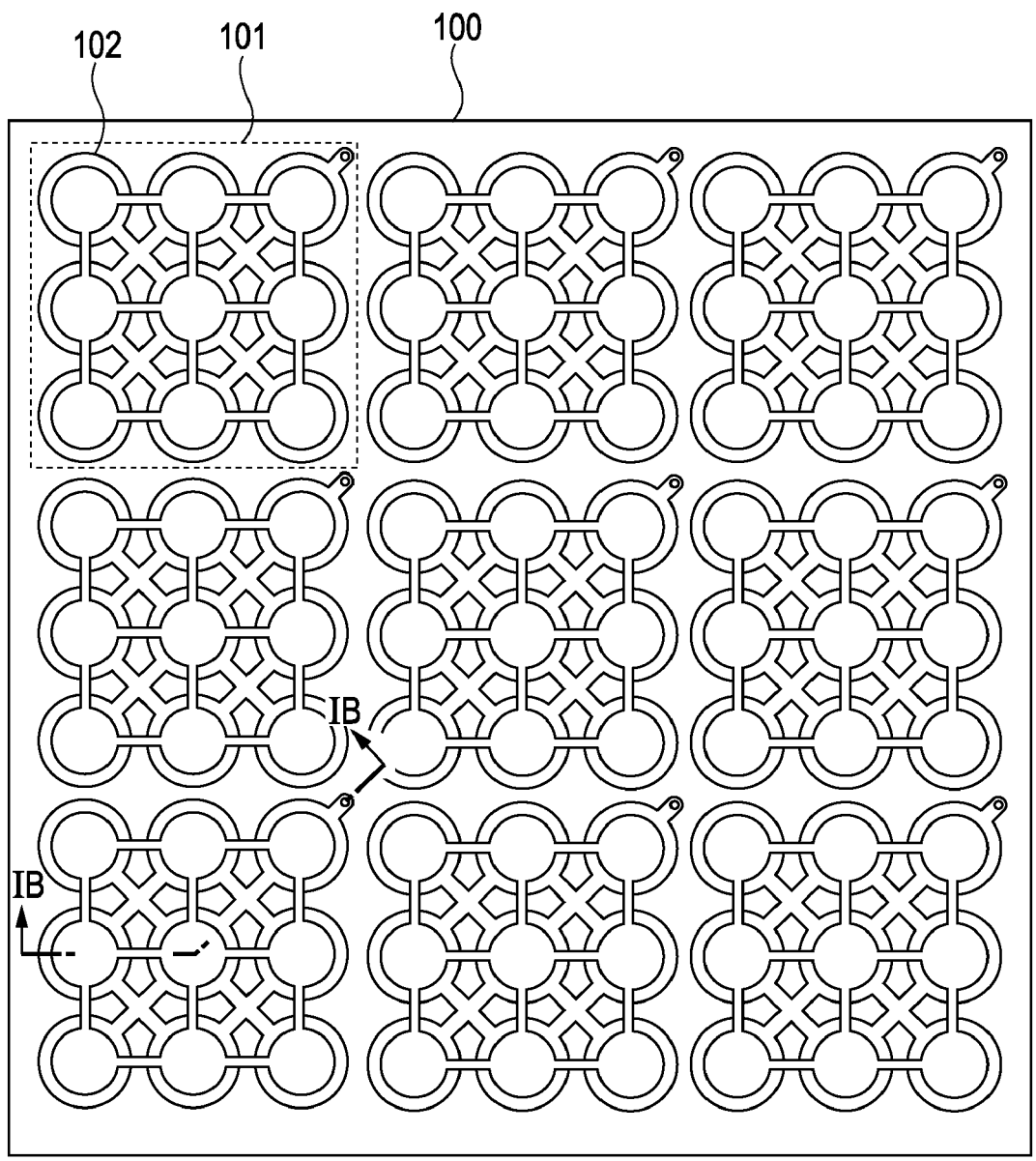
FIG. 2 illustrates the basic structure of a capacitive electro-mechanical transducer of a second embodiment of the present invention.

A capacitive electro-mechanical transducer of a second embodiment will be described. FIG. 2 illustrates the basic structure of the transducer of the present embodiment. As illustrated in FIG. 2, an element 101 has a plurality of cells 102, and a plurality of elements constitute a capacitive electro-mechanical transducer 100. In FIG. 2, nine cells 102 are arranged in an element, and nine elements 101 are arranged in the transducer 100. However, the number of cells and the number of elements are not limited to these numbers. Moreover, while the nine elements 101 are arranged in a two-dimensional array, a plurality of elements may be arranged in a one-dimensional array, for example. The sectional view along the line IB-IB of the element 101 of the present embodiment is the same as that shown in FIG. 1B of the first embodiment.

When a transducer that has a plurality of elements is used to analyze characteristics of a source of sound waves by using individual signals, it is desirable that the sensitivity of the elements be uniform. However, sometimes the individual elements of a transducer have different degrees of sensitivity owing to variations arising in the manufacturing process and the like. For this reason, in the transducer 100 of the present embodiment, the pressure in the gaps of the cells of each element can be adjusted by its pressure-adjusting unit on the basis of the sensitivity of the element that has been measured in advance. In this way, variations in the sensitivity of the plurality of elements 101 can be reduced.

For example, suppose that a transducer is manufactured such that the pressure in the gaps thereof is 0.001 atm, and the sensitivity of one of nine elements thereof is 1 dB higher than those of the others. In such a case, the sensitivity of this element can be lowered about 1 dB by changing the pressure in the gaps of the cells of this element to 0.3 atm, as shown in FIG. 1C. Thus, variations in the sensitivity of the elements can be reduced. In this way, variations in the sensitivity of a plurality of elements can be reduced by increasing or decreasing the pressure in the gaps of individual elements on the basis of sensitivity characteristics of the elements.

For example, the adjustment of sensitivity can be performed in the following manner. An adjustment apparatus has an ultrasonic-wave-transmitting device that is disposed opposite an element of a transducer, so that the element of the transducer can receive waves. The pressure-adjusting unit of the element is connected to the adjustment apparatus. The adjustment apparatus can receive signals from the element. When the operation of adjustment is started, a predetermined ultrasonic wave is transmitted from the ultrasonic-wave-transmitting device. The ultrasonic wave is received by the element of the transducer, and the adjustment apparatus receives a signal from the element. The adjustment apparatus determines whether or not the strength of the signal is equal to a predetermined value. The predetermined value is the signal strength that is obtained when the element has a predetermined degree of sensitivity. When the signal strength is not equal to the predetermined value, the pressure of the element is changed by controlling the pressure-adjusting unit. Thus, feedback control of the pressure-adjusting unit is performed until the signal strength becomes equal to the predetermined value. Such control is performed for each element.

By using the transducer 100 of the present embodiment, variations in sensitivity of the individual elements of a transducer that has a plurality of elements are reduced. Therefore, for example, a capacitive electro-mechanical transducer that is suitable for analysis of characteristics of a source of sound waves can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-127092 filed May 27, 2009, which is hereby incorporated by reference herein in its entirety.

What is claimed is:

1. A capacitive electro-mechanical transducer comprising:
   an element having a cell, the cell including a first electrode and a second electrode that is disposed opposite the first electrode with a gap therebetween; and
   a pressure-adjusting unit that adjust pressure in the gap, the pressure being adjusted based on whether or not a signal strength is equal to a predetermined value, the predetermined value being a signal strength obtained when the element has a predetermined degree of sensitivity.

2. The capacitive electro-mechanical transducer according to claim 1, further comprising
   a plurality of elements each of which includes a plurality of the cells,
   wherein at least one of the elements is provided with the pressure-adjusting unit.

3. The capacitive electro-mechanical transducer according to claim 1,
   wherein the pressure-adjusting unit adjusts sensitivity of the cell or an element, or reduces variation in sensitivity of the plurality of the elements.

4. The capacitive electro-mechanical transducer according to claim 1,
   wherein the first electrode is formed on a substrate, and
   wherein the gap and the pressure-adjusting unit are connected through a through-hole of the substrate.

5. The capacitive electro-mechanical transducer according to claim 1, wherein the pressure-adjusting unit performs feedback control until the signal strength becomes equal to the predetermined value.

* * * * *